No. 670,097. Patented Mar. 19, 1901.
C. BRAUNGER.
SUPPORT FOR FLOWERS.
(Application filed June 22, 1900.)
(No Model.)
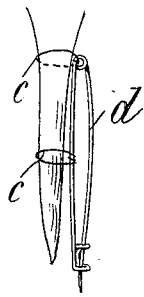
Fig. 5
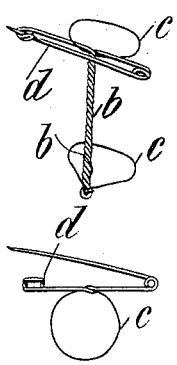
Fig. 3.
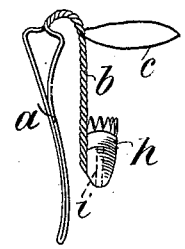
Fig. 1.
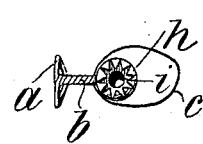
Fig. 2.
Fig. 4.
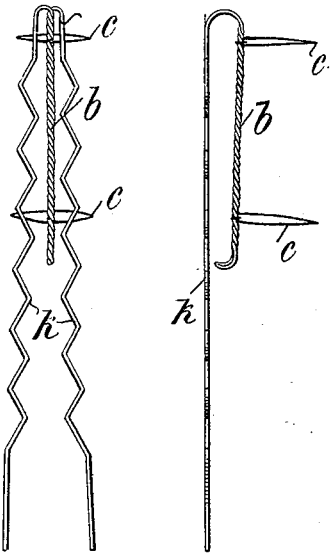
Fig. 6. Fig. 7.
Witnesses:
Inventor:

UNITED STATES PATENT OFFICE.

CARL BRAUNGER, OF MUNDERKINGEN, GERMANY.

SUPPORT FOR FLOWERS.

SPECIFICATION forming part of Letters Patent No. 670,097, dated March 19, 1901.

Application filed June 22, 1900. Serial No. 21,228. (No model.)

*To all whom it may concern:*

Be it known that I, CARL BRAUNGER, mechanic, a subject of the German Emperor, residing at Munderkingen, in the Kingdom of Würtemberg, Germany, have invented new and useful Improvements in Supports or Holders for Flowers, of which the following is a specification.

The present invention relates to an improved support or holder for flowers or nosegays, one purpose of same being to render the support applicable for flowers and nosegays of different sizes.

A further object of the invention is to enable the employment of such supports not only for buttonholes, but also for fastening flowers or bunches of them at any desired place and, if necessary, for ornamenting the hair.

With these ends in view the invention consists in the novel combination and in the peculiar arrangement and adaptation of parts, all as more fully hereinafter described, shown in the accompanying drawings, and then specifically defined in the appended claim.

My invention is illustrated in the annexed drawings, in which—

Figure 1 is a lateral elevation in its application for supporting a buttonhole. Fig. 2 shows a plan view of Fig. 1. Figs. 3 to 7 illustrate modifications in carrying into practice my invention.

My improved flower and nosegay support or holder (shown in Fig. 1) consists of a lower double portion $a$, assuming the shape of a triangle at the upper end, and the loop $c$, made of very thin wire.

The employment of the flower-holder hereinbefore described is as follows: After the flowers, either individually, in a bunch, or in the shape of a buttonhole, are inserted in the loop $c$ the latter is turned, thereby decreasing the size of the loop until the flowers are tightly supported. This being effected, the holder is inserted, with its lower double portion $a$ in the buttonhole, whereupon the flowers rest on the coat or other wearing-apparel.

My improved flower-holder is further provided with a device for keeping the flowers moist, if desired, as illustrated in Figs. 1 and 2. At the lower end of the loop-support $b$ a ferrule $h$, open at the top end, is provided, which contains a ring $i$, made of sponge or spongy material, which absorbs the water filled into the ferrule and imparts same to the flowers inserted with their stems in the ferrule $h$.

The construction of my improved flower-holder illustrated in Figs. 3 to 5 has the lower portion bent so as to assume the shape of a safety-pin $d$, which enables the flowers to be fastened at any desired place on the wearing-apparel.

A further modification of my improved flower-holder is illustrated in Figs. 6 and 7. This construction serves for fastening or securing flowers in the hair. The loop-support $b$ is secured to or terminates in a long hair-pin $k$, which latter may be constructed of any desired shape.

What I claim as new, and desire to secure by Letters Patent, is—

In a flower-holder of the kind referred to, the combination with a device for securing the holder to the wearing-apparel, of horizontal loops made of thin wire, adapted to be twisted for reducing their size, so as to secure the flowers in position, substantially as described and shown.

In testimony whereof I have hereunto set my hand in presence of two subscribing witnesses.

CARL BRAUNGER.

Witnesses:
 HERMANN WAGNER,
 GEORG REINERT.